United States Patent [19]

Palmer

[11] 4,307,813

[45] Dec. 29, 1981

[54] FIRE-RESISTANT ENCLOSURE

[76] Inventor: Thomas W. Palmer, 2907 Del Monte Ct., Missouri City, Fort Bend County, Tex. 77459

[21] Appl. No.: 80,884

[22] Filed: Oct. 1, 1979

[51] Int. Cl.³ .................... B65D 6/24; B65D 25/34; C09D 5/18

[52] U.S. Cl. ............................. 220/4 R; 106/18.11; 220/18; 220/902

[58] Field of Search ............ 220/4 R, 18, 902; 106/18.11, 18.25, 18.29; 229/3.1

[56] References Cited

U.S. PATENT DOCUMENTS

| | | | |
|---|---|---|---|
| 2,414,533 | 1/1947 | Johnston | 106/18.11 |
| 3,477,609 | 11/1969 | Winkler | 220/18 |
| 3,513,248 | 5/1970 | Bright | 220/18 |
| 3,988,402 | 10/1976 | Ueda | 106/18.11 |

OTHER PUBLICATIONS

*Flamemaster* brochure.
*Refractory Products,* John-Mansville brochure.

*Primary Examiner*—George E. Lowrance
*Attorney, Agent, or Firm*—Fulbright & Jaworski

[57] ABSTRACT

A fire-resistant enclosure for a valve or an electrical apparatus. The enclosure has a body formed of a suitable insulating material which is shaped so that it can be placed around a valve or electrical apparatus. The body has one open side which facilitates emplacement. A service cover is provided which is also formed of a suitable insulating material which can be secured over the open side of the body so that the valve is enclosed.

7 Claims, 13 Drawing Figures

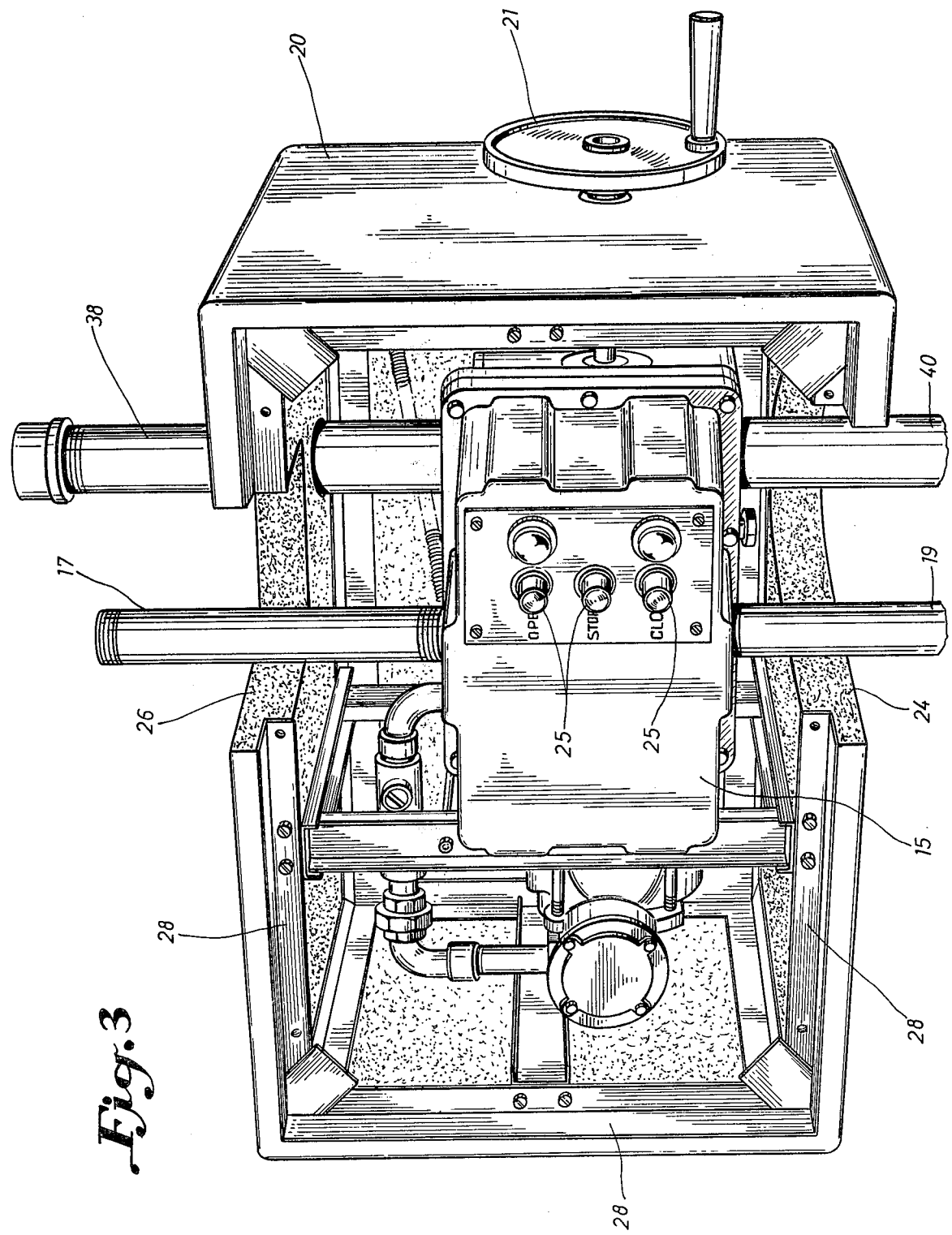

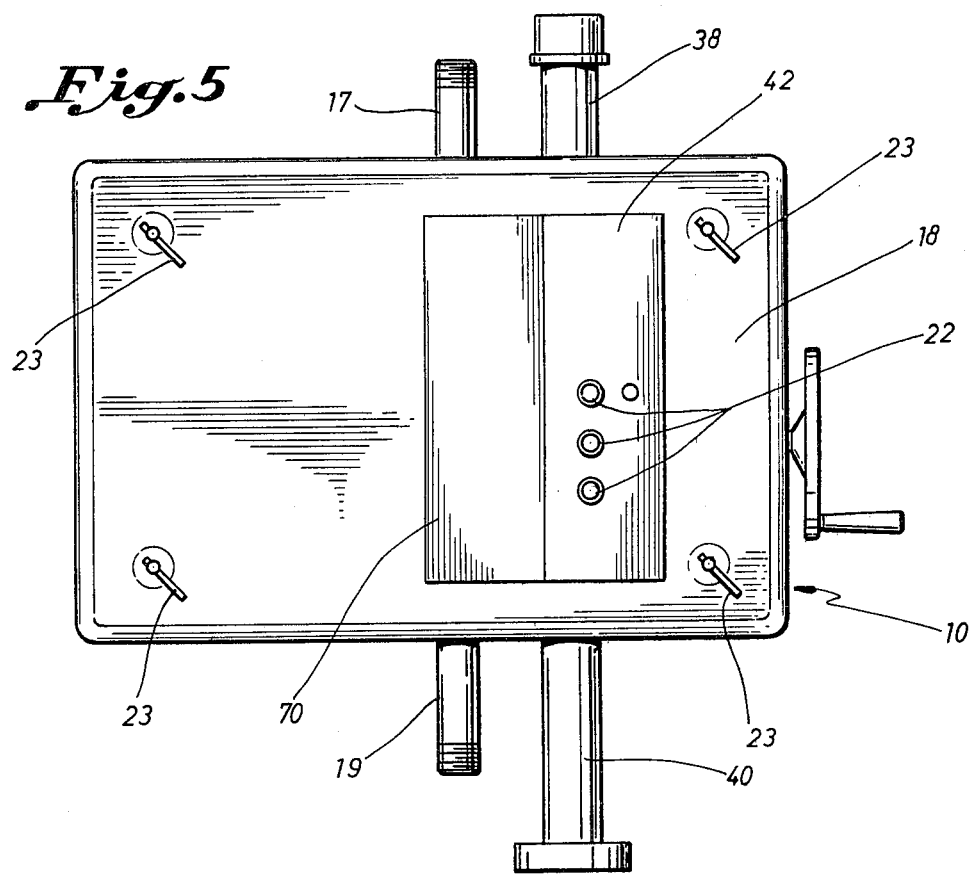
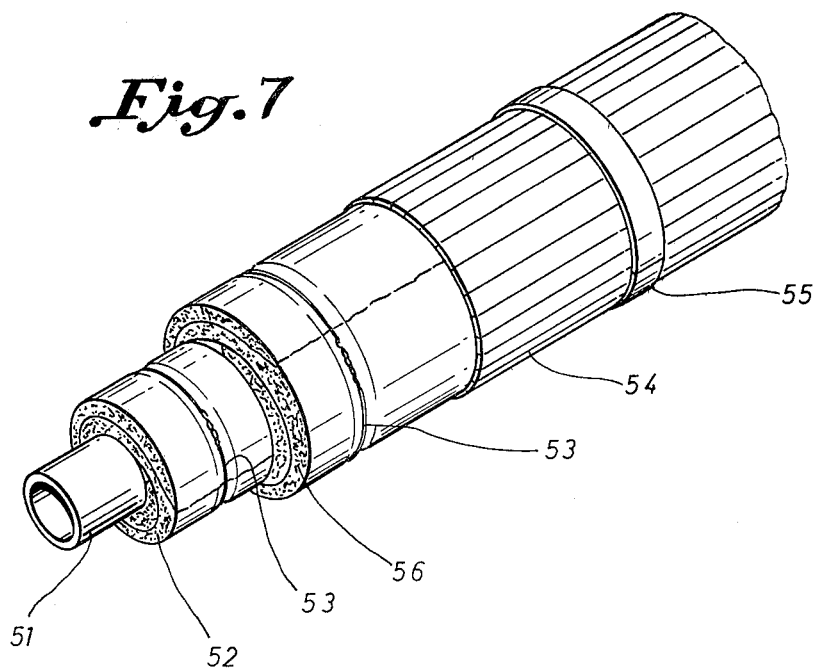

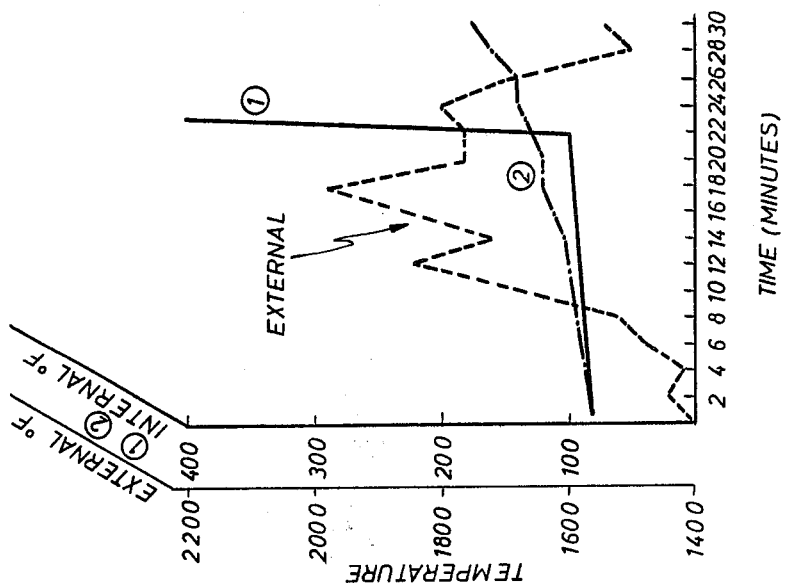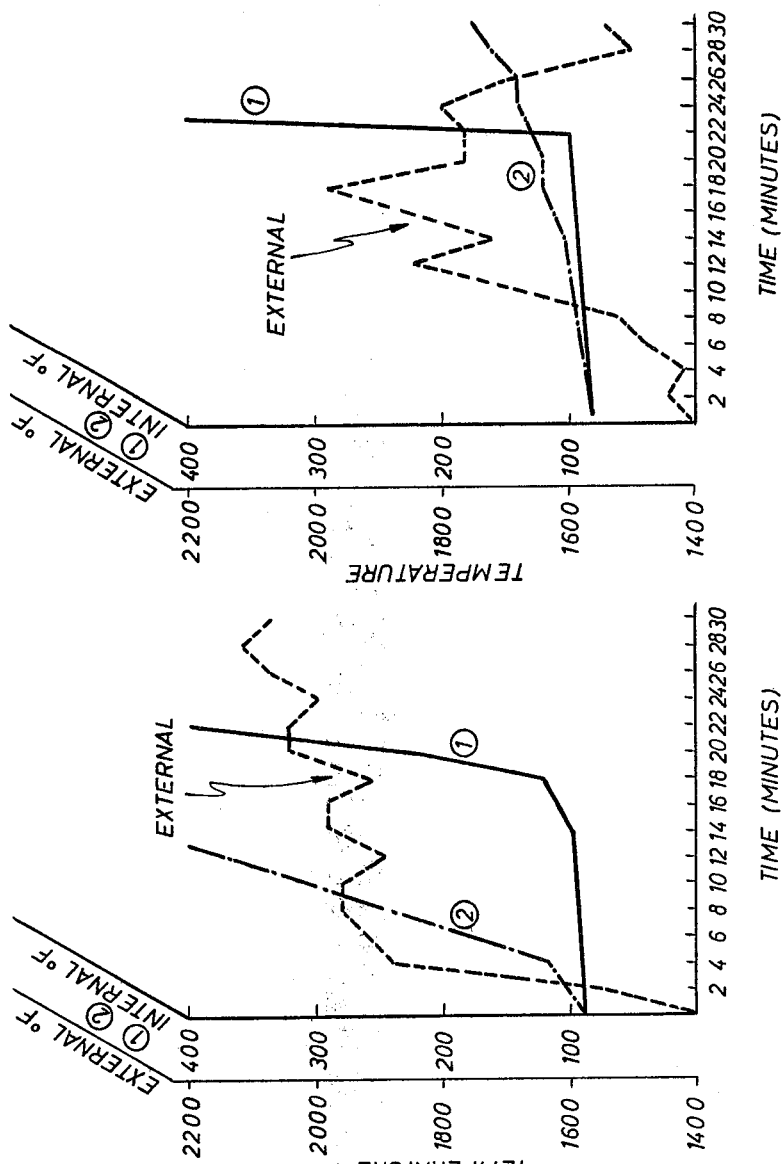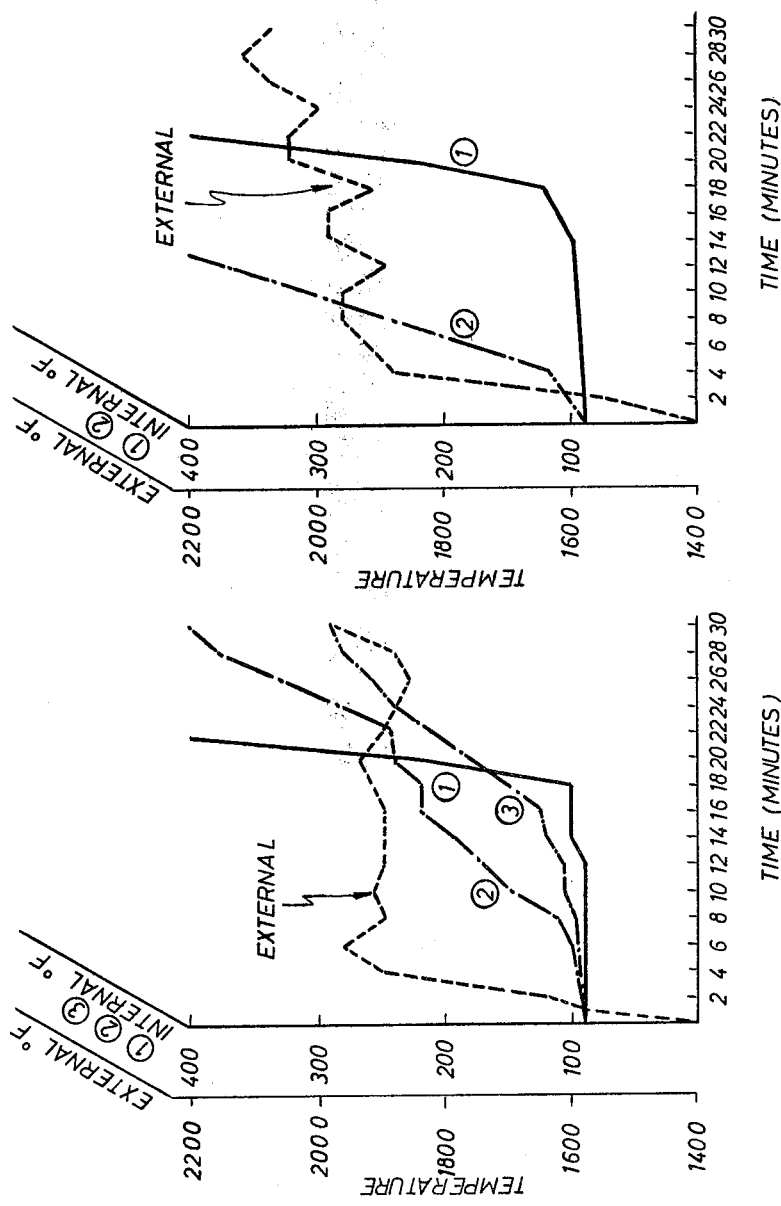

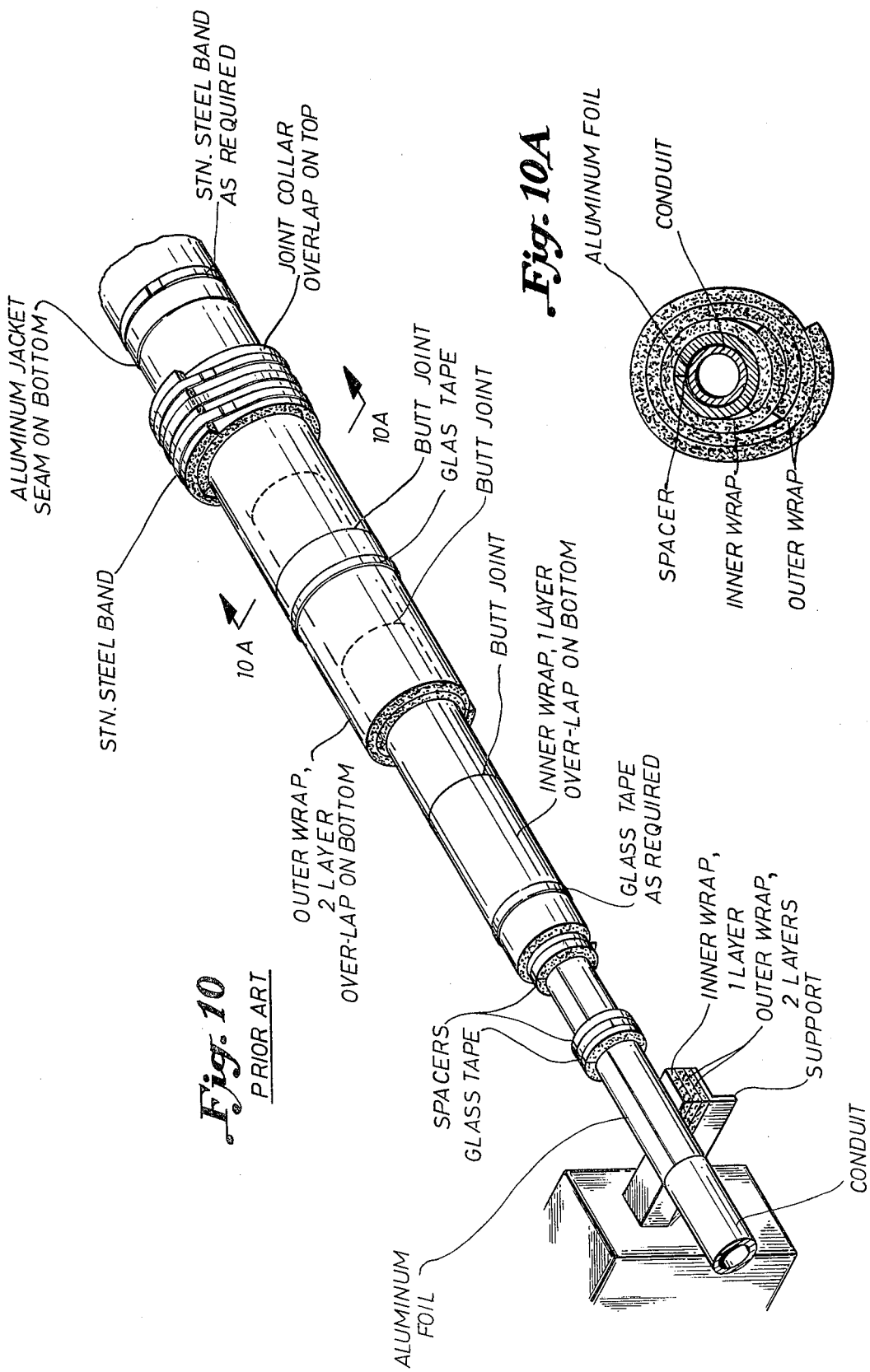

FIRE-RESISTANT ENCLOSURE

BACKGROND OF THE INVENTION

1. Field of the Invention

The present invention relates to the field of fire-resistant enclosures for electrical apparatuses or valves, particularly for electrical motor-operated valves.

2. Description of the Prior Art

Thousands of refinery and chemical plant fires are reported each year. The flow lines in many of these plants are provided with motor-operated valves whose purpose is to provide a controlled shut-down of the plant soon after a fire has started. In many of these fires there are failures of the electrical components either within electrical junction and switch boxes, or within motor-operated valves which render the motor-operated valves useless. Heat damage to insulated wires carried in conduits or cables to the motor-operated valve also renders shutdown systems inoperable. The problem confronting these industries is to protect these apparatuses from the fire for a sufficient period of time after the fire has started so that the apparatus can be used and operated to shut down the plant.

Fires in chemical and refinery plants generate temperatures of 1800°-2000° F., and a suitable fire protection system for a motor-operated valve must maintain the temperature around the valve much lower than this so that the valves remain operable. Various methods and apparatuses have been tried to protect valves, electrical apparatuses, and the conduits leading to them, including sprayed on coatings of insulated material and bags formed of insulating material.

These solutions are unsatisfactory. Sprayed on coatings have caused electrical motor failures. The coatings must be removed for routine maintenance and often are not replaced following such maintenance. Bags made of insulating material require lacing together after being placed on an apparatus. Often maintenance personnel do not replace a bag after maintenance is performed on an apparatus due to the time required to lace up the bag. A bag in place over a valve is either entirely or partially destroyed or removed when hit by a stream of water or chemicals which is being used to extinguish a fire. The bag is then useless if the fire is rekindled or if a "flashback fire" occurs. The Flamemaster insulated enclosure is an example of an unsatisfactory bag-type enclosure.

SUMMARY OF THE INVENTION

The present invention is directed to a fire-resistant enclosure for an electrical apparatus or a valve, particularly for a motor-operated valve, which satisfactorily solves the problem of providing fire protection for the apparatuses which are employed in refineries and chemical plants to provide a controlled shutdown of the plant in the event of a fire. The present invention provides a fire-resistant enclosure for such apparatuses which is efficient, easily installed, and which permits access to the apparatus within the enclosure.

A fire-resistant enclosure according to the present invention has a box-shaped body member with one open side. Appropriate portions of the box are cut out to form recesses and openings for facilitating emplacement of the box around an apparatus. These recesses and openings can be formed and positioned to correspond to the particular type of apparatus to be enclosed.

After the body member has been emplaced around the apparatus, inserts conforming to the shape of the recesses are positioned in the recesses. The inserts are secured to subflanges which are themselves secured to the body member to insure that the inserts are held firmly in place in the recesses. A body flange extends around and is secured to the edge of the open side of the body. A service cover is provided which is securable over the open side of the body. When the body, inserts and service cover are secured in place, the apparatus is enclosed.

Openings may be provided in the body through which may extend shafts for various controls on the apparatus so that the control may be actuated while the fire-resistant enclosure is emplaced around the apparatus; for example, a manual hand wheel could be positioned outside of the fire-resistant enclosure by extending its shaft through an opening in the body. Such openings are sealed as required to maintain the fire-protective capabilities of the enclosure.

For securing the service cover to the body, quick release, rotatable latches can be mounted in the service cover which engage the box flange. The service cover can also be provided with a sealable access door to permit access to the apparatus within the enclosure while the enclosure is in place on the apparatus. This access door may be provided with push buttons which correspond in position to push buttons on the apparatus so that the apparatus push buttons may be actuated without having to either open the access door or remove the fire-resistant enclosure from the apparatus.

It has been known in the art that refractory fiber material is an excellent insulating material; but it is also extremely hygroscopic. It will hold many times its own weight in water and it requires a very long time to dry. It has such a great affinity for water that it will readily absorb and retain moisture simply from exposure to the air. Consequently, it has not been utilized as successfully as possible as a fire-protective insulating material. Applicant has discovered a method for moisture proofing refractory fiber so that it can be used effectively in a fire-resistant enclosure for a valve or for an electrical apparatus. The method involves spraying a composition of paraffin, triethanol amine stearate and water onto boards, blankets, or pieces of refractory fiber material and then heat treating the material in an oven. Rather than adding to combustion in a fire, the paraffin melts and retreates into the refractory fiber material before the fire. In addition to this treatment, the enclosure can be treated both inside and out with one or more coats of vinyl mastic paint. Seams, voids, and openings can also have tape applied to them to seal them. This treated material makes an excellent protector for conduits and cables.

It is, therefore, an object of the present invention to provide a safe, efficient, and effective fire-protective enclosure for an electrical apparatus or for a valve.

Another object of the present invention is the provision of such an enclosure which can be installed quickly and easily.

Yet another object of the present invention is the provision of an enclosure which can be formed to conform to one of a variety of types of electrical apparatuses such as switches, junction boxes, or motor-operated valves.

An additional object of the present invention is the provision of a fire-resistant enclosure for a motor-operated valve which will maintain the temperature of the valve at a sufficiently low level so that the valve can be operated as intended to assist in the shutdown of the plant where the valve is employed after a fire has begun at the plant.

A further object of the present invention is the provision of an enclosure which is generally box-shaped with one side of the box open so that the box can be easily emplaced around an apparatus.

A still further object of the present invention is the provision of a service cover which is easily securable to and easily removable from the open side of the box-shaped body member.

Another object of the present invention is the provision of easily accessible latches for securing the service cover to the body member.

Yet another object of the present invention is the provison of openings and recesses in the enclosure through which can extend various parts of the apparatus or the various conduits, wires and cables necessary for the operation of the apparatus.

A further object of the present invention is the provision of such an enclosure wherein inserts are provided which conform to the various recesses so that the recesses will be effectively sealed when the enclosure is in place.

A still further object of the present invention is the provision of subflanges to which are secured the various inserts, the subflanges themselves being securable to the body member.

An additional object of the present invention is the provision of a method for moisture-proofing refractory fiber material so that it can be used effectively as the fire-resistant material from which the enclosure is formed.

Another object of the present invention is the provision of an access door in the service cover of the enclosure so that the valve can be accessed or maintained when the enclosure is emplaced around the valve.

Yet another object of the present invention is the provision of push buttons in the service cover corresponding to push buttons on the apparatus so that the apparatus push buttons can be actuated without the necessity of either opening the access door or removing the enclosure from around the apparatus.

Still another object of the present invention is the provision of such an enclosure which will survive a typical fire so that it can be reused.

A further object of the present invention is the provision of a fire-resistant enclosure with a minimal number of parts so that handling and installation are easier and fire protective ability is enhanced.

A particular object of the present invention is the provision of a method and apparatus for providing a fire protection enclosure for the conduits and cables leading to the apparatus.

Another particular object of the present invention is the provision of a moisture-proofing method of and apparatus for utilizing refractory fiber material as insulating material for conduits.

Other and further objects, features and advantages of the present invention will be apparent from the following description of a presently-preferred embodiment thereof, given for the purpose of disclosure, and taken in conjunction with the accompanying drawings.

BRIEF DESCRIPTION OF THE DRAWINGS

FIG. 3 is a side view of the body member of the enclosure emplaced around the valve.

FIG. 5 is a side view showing the service cover of the enclosure.

FIGS. 6A and 6B and 6C contain three graphs of temperature versus time which illustrate the change in temperature both outside and inside an enclosure according to the present invention during a fire.

FIG. 7 shows a conduit protected by the insulating material and method according to the present invention.

FIGS. 10 and 10A are views of a prior art conduit cover.

DESCRIPTION OF THE PREFERRED EMBODIMENT

By way of illustrative disclosure and not limitation, this detailed description presents one preferred embodiment of the fire-resistant enclosure according to the present invention. It will be readily apparent to one skilled in this art that a fire-resistant enclousre according to the present invention can be formed and shaped so that it is suitable for use with a variety of different electrical apparatuses in addition to motor-operated valves, junction boxes, and switches.

Figure 1:
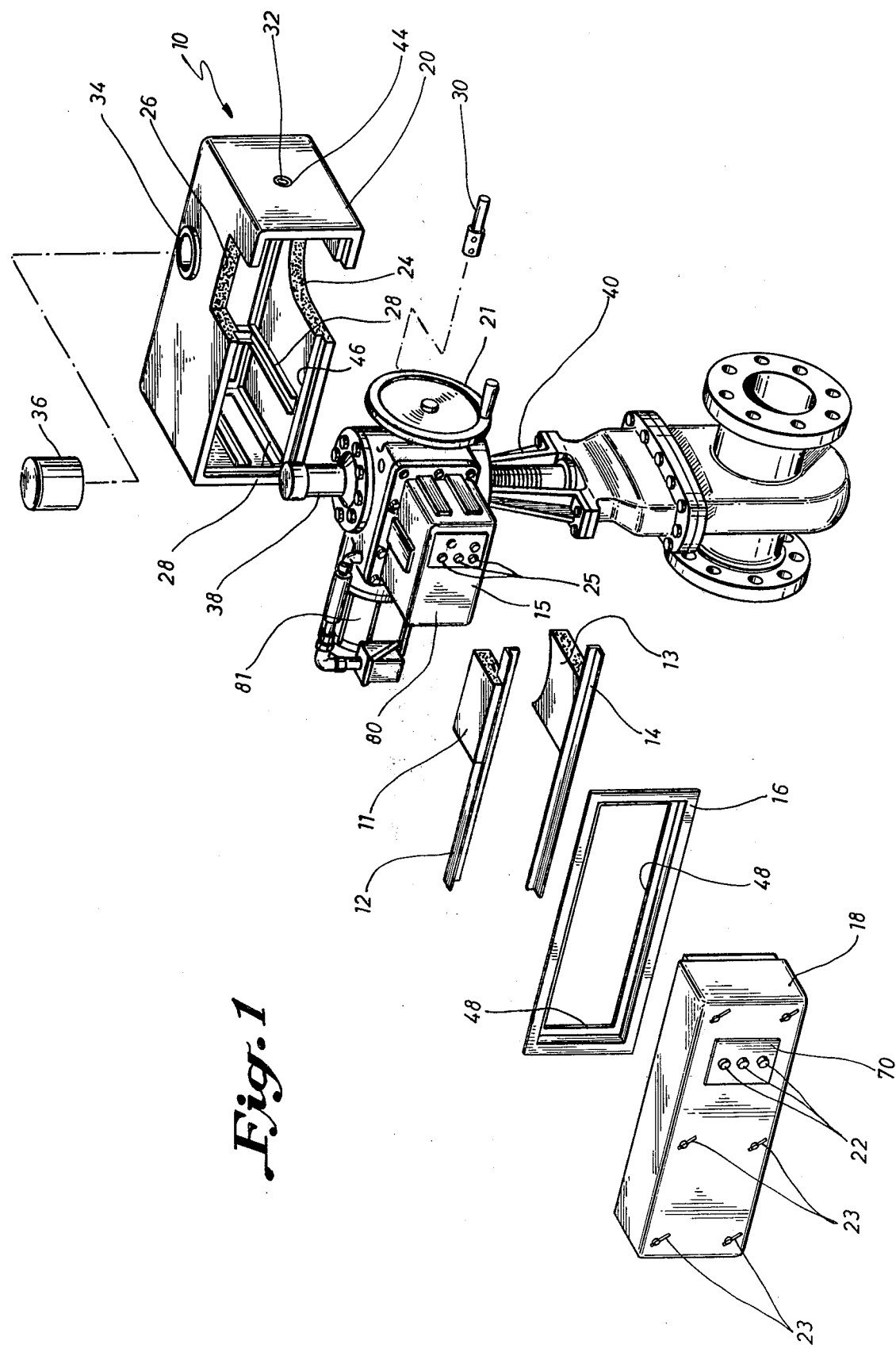
FIG. 1 is an exploded prospective view of the device and also illustrates a motor-operated valve to which the device is to be applied.

Referring now to the drawings, throughout the various figures the reference numeral 10 generally designates the fire-resistant enclosure according to the present invention. As shown in the exploded view of FIG. 1, the fire-resistant enclosure 10 has the box-shaped body member 20, the subflanges 12 and 14, the box flange 16, the stem cover 36, and the service cover 18. The body member 20 has appropriate openings 32 and 34 for accommodating protrusions and projections of the motor-operated valve 15.

The opening 34 accommodates the stem protector 38 and the opening 32 accommodates the stainless hand wheel extension 30 which is utilized so that the hand wheel 21 of the valve 15 can be positioned outside of the body member 20. The stem protector 38 is covered by the stem cover 36. The body member 20 has the recesses 26 and 24 for accommodating the conduits leading to the valve 15. The body member 20 may be reinforced with internal stainless frame members 28. The seal 44 is provided to seal the stainless hand wheel extension 30 in the opening 32.

The subflange 12 has the insert 11 which conforms to the recess 26 so that the recess 26 can be effectively sealed off when the enclosure 10 is emplaced around the valve 15. Similarly the subflange 14 has the insert 13 which conforms to the recess 24. The box flange 16 corresponds to the edge of the open side 46 of the body member 20. The service cover 18 is formed so that it can be accommodated by and sealed against the box flange 16 thereby effectively sealing off the open side 46 of the body 20 when the enclosure 10 is emplaced around the valve 15.

The service cover 18 has the access door 70 which has the push buttons 22 corresponding to the push buttons 25 on the switch compartment 80 of the valve 15. When the enclosure 10 is emplaced around the valve 15, pushing one of the push buttons 22 will result in the actuation of its corresponding push button 25 on the valve 15. The service cover 18 is also provided with rotatable latches 23 which engage the edge 48 of the box flange 16 when the box flange is secured to the body member 20, thereby insuring that the service cover is secured to the body member 20. It is to be understood that, as required by the apparatus to be protected, the push buttons 22 can be positioned in the service cover 18 itself rather than in the access door.

In order to insure that the enclosure 10 is sealed around the valve 15, the service cover 18 and the access door 70 can be provided with weatherstripping to insure a tight and secure closure. In addition, the seams between the inserts and the recesses, the seams around the opening and the seam between the service cover 18 and the body member 20 can be sealed with appropriate tape; for example, by way of illustration and not limitation, vinyl or glass tape may be used.

Figure 2:
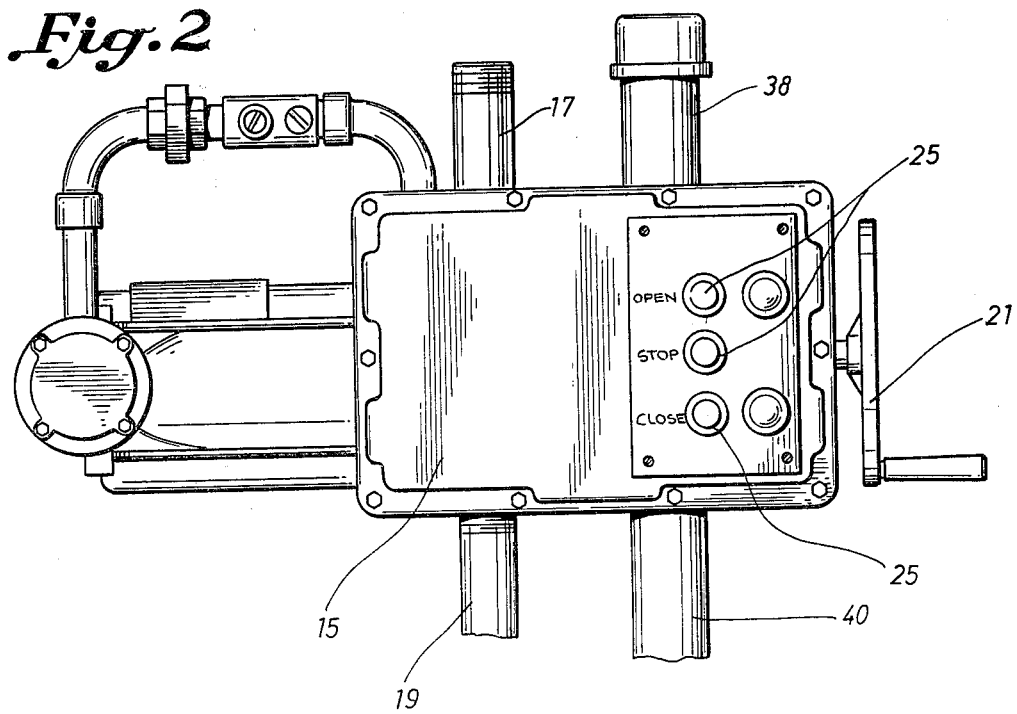
FIG. 2 is a side view of a typical motor-operated valve to which the device is to be applied and shows conduit lines leading to the valve.

As shown in FIG. 2, the motor-operated valve 15 has the conduits 17 and 19 leading to it. The stem protector 38 projects from the top of the valve 15 and the valve mounting yoke 40 leads to the bottom of the valve 15. The valve 15 also has the motor 18, control push buttons 25, and the hand wheel 21 by means of which the valve 15 can be manually operated.

FIG. 3 illustrates the box-shaped body member 20 in place around the valve 15. The stem protector 38 projects through the opening 34 (not shown). The conduit 17 projects through the recess 26. The conduit 19 and the mounting yoke 40 project through the recess 24. The hand wheel extension 30 (not shown) projects through the body member 20 so that the hand wheel 21 can be positioned outside of the body member 20 thereby making it possible to manually operate the valve 15 with the enclosure 10 in place around the valve.

Figure 4:
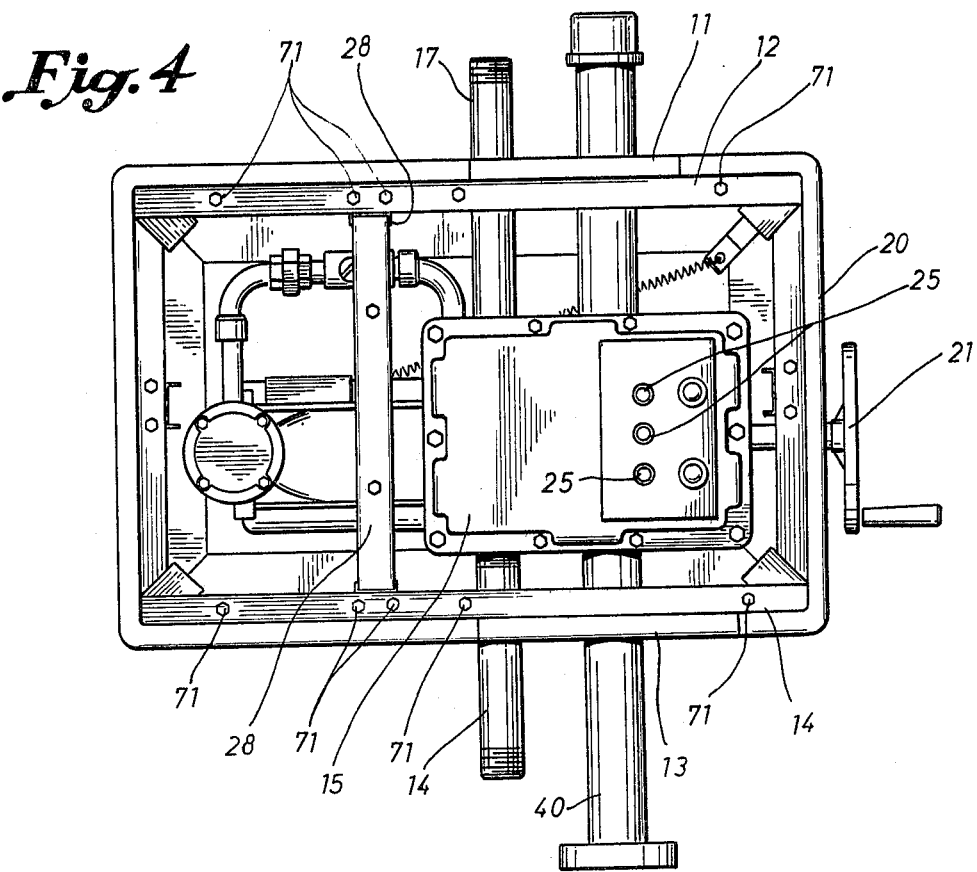
FIG. 4 is a side view showing the body member with subflanges emplaced around the valve.

FIG. 4 illustrates the body member 20 in place around the valve 15 after the subflanges 12 and 14 have been installed. The subflanges 12 and 14 are secured to sections of the internal stainless steel frame 28 by means of the bolts 71.

Referring now to FIG. 7, the conduit 51 is protected by the inner wrap 52 and the outer wrap 56. The inner wrap 52 is composed of two layers of moisture-proofed refractory fiber blanket. Similarly, the outer wrap 56 is composed of two such layers. The tie wires 53 are utilized to hold both the inner wrap 52 and the outer wrap 56 in place around the conduit. The stainless steel cover 54 is wrapped around the outer wrap 56 to protect the inner wrap 52 and the outer wrap 56 from the weather and also from the water or chemicals that would be used to extinguish a fire. This insures that the cover will be intact in the event of a flashback fire. The stainless steel cover 54 is held in place by the stainless steel band 55.

Figure 8:
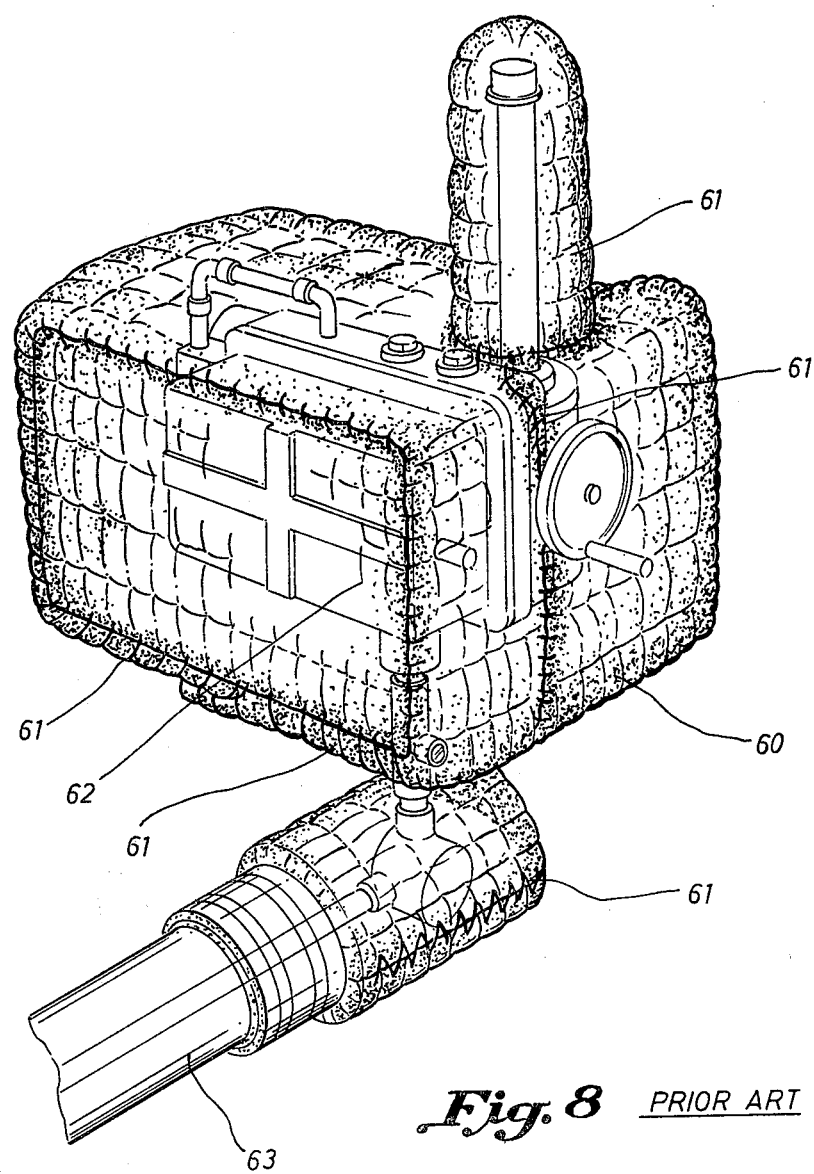
FIG. 8 illustrates a prior art laced-bag type apparatus emplaced around a motor-operated valve.

FIG. 8 illustrates a cumbersome prior art laced-bag apparatus 60 in place around a valve 62. Numerous laces 61 are required to hold the bag 60 in place. In order to remove the bag 60 from around the valve 62 for purposes such as maintenance and inspections, a tedious unlacing operation is necessary. When the inspection or maintenance is completed, a tedious lacing operation is again required to replace the bag 60 around the valve 62. The same problems with the lacing are encountered with that portion of the bag 60 that is emplaced around the conduit 63. Another disadvantage of a bag-type enclosure such as that depicted in FIG. 8 is that the bag cannot withstand the effect of streams of water or chemicals which are used in extinguishing fires at refineries and chemical plants. Consequently, if the fire is rekindled or if there is a flashback fire which is common in these industries, the bag will no longer serve to protect the valve around which it had been emplaced.

The preferred insulating material to be used in the construction of the fire-resistant enclosure 10 according to the present invention is a specially treated refractory fiber material. By way of example and not limitation, the refractory fiber material marketed by Johns-Manville under the trademarks CERAFIBER, CERABLANKET, and CERAFORM is such a material. Such material is used in confined combustion areas. Untreated refractory fiber material has such a great affinity for water that it will absorb moisture from the air. When it gets wet, it will hold many times its own weight in water, requires a very long time to dry, and loses its structural strength. These problems are overcome when the material is treated according to the method of the present invention. According to this method, paraffin is mixed with an emulsifier such as triethanol amine sterate and water. This mixture is then sprayed on the refractory fiber material. The sprayed material is then heat treated in an oven. The preferred temperature is 275° F. and the preferred time is 4 minutes.

The treated and dried material may be given one or more coats of vinyl mastic paint. The vinyl mastic paint may be applied to both the inside and the outside of an enclosure after an enclosure has been formed from the treated material. The structural strength of the material can be increased by spraying it with a colloidal silicate such as, for example and by way of illustration and not limitation, Nalco Chemical Company's Nalcoag 1115 or 1140, and then drying it in an oven. The preferred drying time for this step is 5 minutes at a preferred temperature of 275° F. If circumstances do not permit oven drying, open air drying may be employed.

The three graphs depicted in FIG. 6 illustrate the data obtained in tests of fire-resistant enclosures made according to the present invention. Graph A illustrates the performance of a fire-resistant enclosure employed around a motor-operated valve such as the motor-operated valve 15. Graph B illustrates the performance of a fire-resistant enclosure used to protect a junction box such as Junction Box Model JBW-12-124V manufactured by the Curlee Division of Thermon Manufacturing Company. Graph C illustrates the performance of a fire-resistant enclosure according to the present invention employed around a disconnect switch such as a Nelson Electric Division Class 600 Nema 7 Circuit Breaker manufactured by Nelson-Gulf Coast, Inc.

The protected motor-operated valve, junction box and disconnect switch were subjected to a fire pit test in which the outside temperature was maintained at 2000° F.±200° F. for a period of 30 minutes. Each graph presents the data for a plurality of thermocouples which were positioned inside the enclosures and devices, as well as the external temperature, for the 30 minute time period.

Graph A presents the data obtained from three thermocouples. Thermocouple number 1 was installed inside the switch compartment of the motor-operated valve. The reading on thermocouple 1 indicated 90° F. for the first 12 minutes. From 12–14 minutes, the reading increased to 100° F. and remained at 100° F. until 20 minutes had expired. At 20 minutes, the thermocouple lead in the conduit inside the pit wall shorted causing the temperature reading of thermocouple 1 to rise dramtically. This failure of a thermocouple lead in a conduit clearly illustrates the need to protect all the components of a system to be fire-proofed including conduits and cables.

At the beginning of the test thermocouple 2 read 90° F. and slowly increased to 103° F. at 8 minutes. At 16 minutes, the reading was 209° F. and it then increased to 400° F. at 30 minutes. Thermocouple 2 was placed inside the running motor to determine the effect of the internal heating on the motor. The motor was run continuously during the test. It can be concluded from these results that the motor of a motor-operated valve does not need special insulation and that the fire-resistant enclosure according to the present invention provides adequate protection for the motor.

Thermocouple 3 inside the enclosure and outside of the motor-operated valve read 90° F. at the start of the test and rose at a steady rate during the 17 minutes of the test to 125° F. After 30 minutes had expired, the reading on this thermocouple was 280° F. From the data presented in Graph A, it can be concluded that a fire-resistant enclosure according to the present invention will protect a motor-operated valve during a fire for a sufficient amount of time to permit the motor-operated valve to be actuated to bring about plant shutdown.

Graph B presents the data obtained from two thermocouples. Thermocouple 1 positioned inside the junction box read 90° F. at the start of the test. This reading rose very slowly for 14 minutes to 98° F. until the thermocouple lead for thermocouple 1 inside the conduit shorted out at the fire pit wall. Prior to shorting out, the maximum reading on the thermocouple was 108° F. Again, this failure indicated the necessity of protecting the conduit.

Thermocouple 2 which was positioned inside the fire-resistant enclosure and outside the junction box, read 90° F. at the start of the test. The reading rose to 105° F. at 4 minutes and then the reading rose very sharply for the remainder of the test. It was found after the test that thermocouple 2 was installed with a portion of the fire-resistant enclosure removed so that the thermocouple was partly in the fire. The lead wire had been pulled or moved prior to the start of the test and as a result the fire-resistant enclosure had not been fully sealed. It should be noted that even with the fire-resistant enclosure partially open, the temperature inside the enclosure did not rise above 200° F. until over 7 minutes had expired.

Two thermocouples were used to acquire the data presented in Graph C. Thermocouple 1 positioned inside the disconnect switchbox read 90° F. at the start of the test. This reading rose at a very slow rate to 98° F. at 22 minutes. At this point, the thermocouple lead inside the conduit at the pit wall shorted out and the temperature rose dramatically. Thermocouple 2 outside the disconnect switch box and inside the enclosure read 90° F., at the start of the test and rose at a slow but steady rate to 160° F. at the end of the test 30 minutes later. This data clearly shows that the fire-resistant enclosure according to the present invention is more than adequate to protect a switch box for a period of time necessary to achieve plant shutdown.

Polyvinyl chloride insulation installed on conduits, wires or cables fail in 40 to 60 minutes in a typical hydrocarbon fire which generates temperatures in the range of 1800°–2000° F. The fire protection system according to the present invention can protect a conduit or cable leading to an electrical apparatus so that there is sufficient time for the use or actuation of the apparatus subsequent to the time that a fire commences. According to the present invention, refractory fiber blanket treated as described above is wrapped around a conduit such as the conduit 51 illustrated in FIG. 7. The conduit 51 is double wrapped. The initial wrap is the inner wrap 52 which is two layers of a two-inch refractory fiber blanket. The final wrap is the outer wrap 56 which is two more layers of a two-inch refractory fiber blanket. The wraps can be installed to the desired half-inch thickness without leaving a void. Each wrap is secured in place by means of the tie wires 53. The conduit 51 is further protected by means of the stainless steel cover 54 which is held in place by the stainless steel bands 55.

Figure 9:
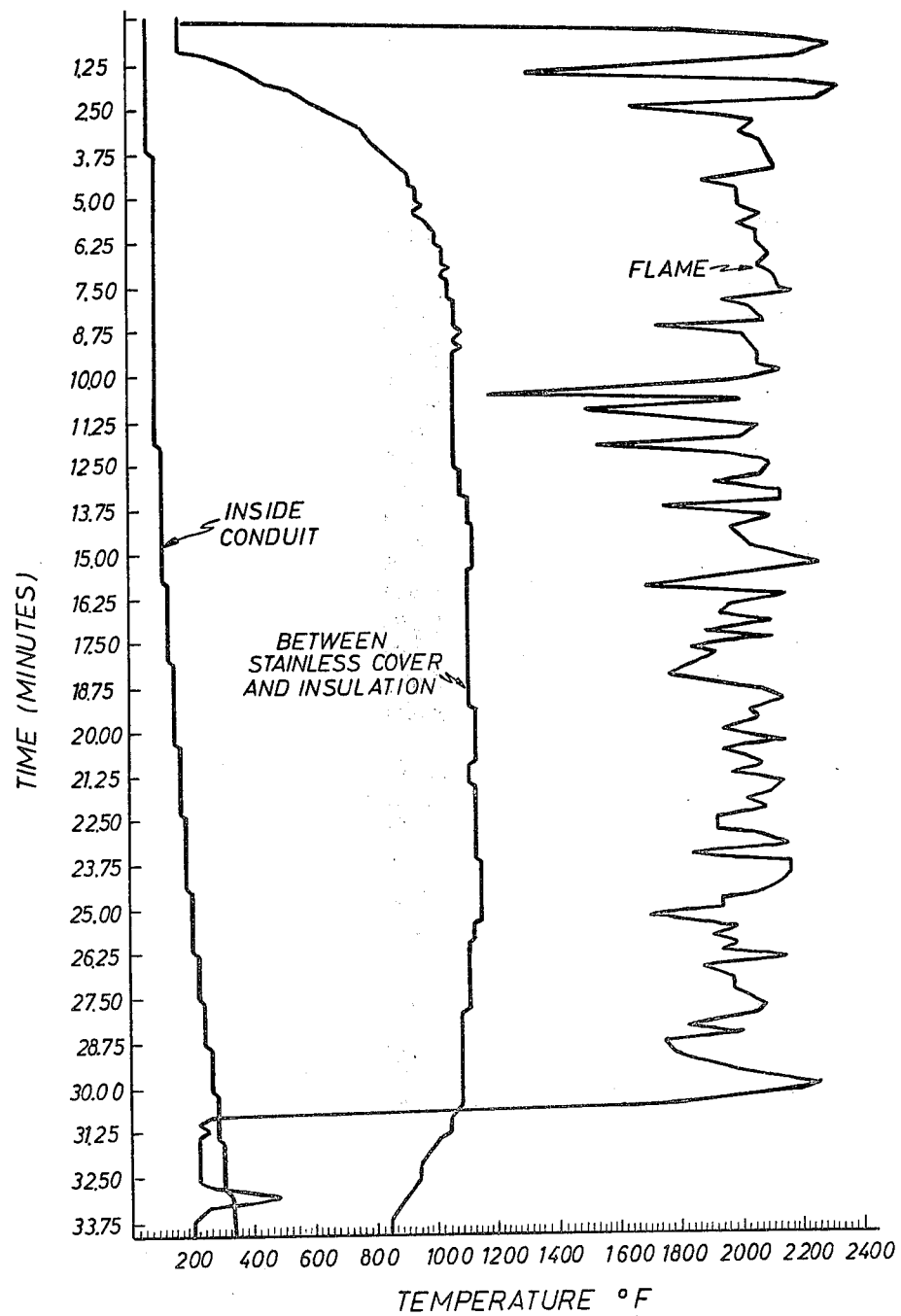
FIG. 9 is a graph of temperature versus time which illustrates the change in temperature both outside and inside a conduit protected according to the present invention in a fire.

During tests in which a conduit treated with the fire protection material according to the present invention was subjected to an outside temperature of approximately 2000° F., the temperature within the conduit rose to 105° F. after 15 minutes and to 200° F. after 24½ minutes. After 6 minutes, the temperature between the blanket and the stainless steel cover rose to 1050° F. and remained at that level for the remainder of the test. This data is reflected graphically in FIG. 9. These tests illustrate that a conduit protected with a fire-resistant enclosure according to the present invention will be protected for a sufficient period of time to permit the use or actuation of the apparatus to which the conduit is connected.

As illustrated in FIGS. 10 and 10A, prior art protective insulation for conduits has a number of disadvantages. Such a prior art device cannot withstand the stream of water or chemicals employed to extinguish a fire and, therefore, if there is a flashback fire, the conduit will then be unprotected. Also a conduit protector as shown in FIG. 10 provides poor protection from the weather and requires excessive installation time.

The foregoing disclosure and description of the invention is illustrative and explanatory thereof and various changes in the size, shape and materials as well as in the details of the illustrated construction, may be made within the scope of the appended claims without departing from the spirit of the invention.

What is claimed is:

1. A sealable enclosure for protecting a valvve or an electrical apparatus, the enclosure comprising,
 a body for emplacing about the valve or electrical apparatus, the body formed of fire-resistant material and having a plurality of recesses therein for accommodating the valve or electrical apparatus, the body having an open side for facilitating emplacement of the enclosure about the valve or electrical apparatus,
 a plurality of inserts for coacting with the recesses of the body, the inserts formed of fire-resistant material, one insert corresponding to and conforming to each of the plurality of recesses and sealably securable therein to close off the recess for protecting the valve or electrical apparatus from the environment outside the enclosure, and a service cover for coacting with the open side of the body, the service cover formed of fire-resistant material and sealably securable at the open side of the body to close off the open side for protecting the valve or electrical apparatus from the environment outside the enclosure.

2. The enclosure of claim 1 including means for securing the service cover to the body, the means including a body flange mounted to and around the open side of the body and a plurality of rotatable latches mounted to and extending through the service cover for engaging the body flange thereby sealably securing the service cover to the body.

3. The enclosure of claim 1 including a plurality of means for securing each of the plurality of inserts in its corresponding recess, the means including a plurality of subflanges, a subflange mounted on each of the plurality of inserts, each of the plurality of subflanges sealably securable to the body.

4. The enclosure of claim 1 wherein the service cover has an access door movably mounted therein for permitting access to the enclosed valve or electrical apparatus.

5. The enclosure of claim 1 wherein the service cover has mounted therethrough means for actuating the enclosed valve or electrical apparatus.

6. The enclosure of claim 1
   wherein the electrical apparatus includes protruding actuating means and
   wherein the enclosure includes protective means securable thereto and formed of fire-resistant material for enclosing and protecting the protruding actuating means.

7. The enclosure of claim 6 wherein the protruding actuating means includes a conduit connected to the electrical apparatus.

* * * * *